United States Patent [19]

Kanada et al.

[11] Patent Number: 5,109,523
[45] Date of Patent: Apr. 28, 1992

[54] METHOD FOR DETERMINING WHETHER DATA SIGNALS OF A FIRST SET ARE RELATED TO DATA SIGNAL OF A SECOND SET

[75] Inventors: Yasusi Kanada, Tokyo; Shunichi Torii, Musashino; Keiji Kojima, Kokubunji, all of Japan

[73] Assignee: Hitachi, Ltd., Tokyo, Japan

[21] Appl. No.: 481,706

[22] Filed: Feb. 15, 1990

Related U.S. Application Data

[63] Continuation of Ser. No. 6,425, Jan. 23, 1987, abandoned.

[51] Int. Cl.⁵ .............................................. G06F 7/20
[52] U.S. Cl. ..................... 395/800; 364/728.03; 364/DIG. 1
[58] Field of Search ... 364/200 MS File, 900 MS File, 364/728.03

[56] References Cited

U.S. PATENT DOCUMENTS

| | | | |
|---|---|---|---|
| 3,930,231 | 12/1975 | Henrichon, Jr. et al. | 382/27 |
| 4,525,796 | 6/1985 | Omoda et al. | 364/200 |
| 4,589,067 | 5/1986 | Porter et al. | 264/200 |
| 4,621,324 | 11/1986 | Ushiro et al. | 364/200 |
| 4,630,192 | 12/1986 | Wassel et al. | 364/200 |
| 4,661,900 | 4/1987 | Chen et al. | 364/200 |

*Primary Examiner*—Eddie P. Chan
*Attorney, Agent, or Firm*—Antonelli, Terry, Stout & Kraus

[57] ABSTRACT

A method for controlling a vector processor so as to detect whether or not a value of each data signal among a first set of data signals has a specific relation with a value of one of a second set of data signals. The vector processor includes an operation unit for performing an arithmetical or logical operation in a pipeline manner on vector data. First and second vector data are formed each including groups of data signals related to the first and second set of data signals. The operation of the operation unit is controlled such that the operation unit detects whether or not a value of each data signal of the first vector data has a specific relation with a value of a corresponding data signal of the second vector data. Third vector data including result data signals is generated thereby which indicate the result of the operation.

4 Claims, 16 Drawing Sheets

FIG. 2

200 bird(penguin). ----201
bird(swallow). ----202
bird(hen). ----203 cannotFly(penguin). ----204
cannotFly(hen). ----205

?- bird(X), cannotFly(X), write(X), fail. ----206

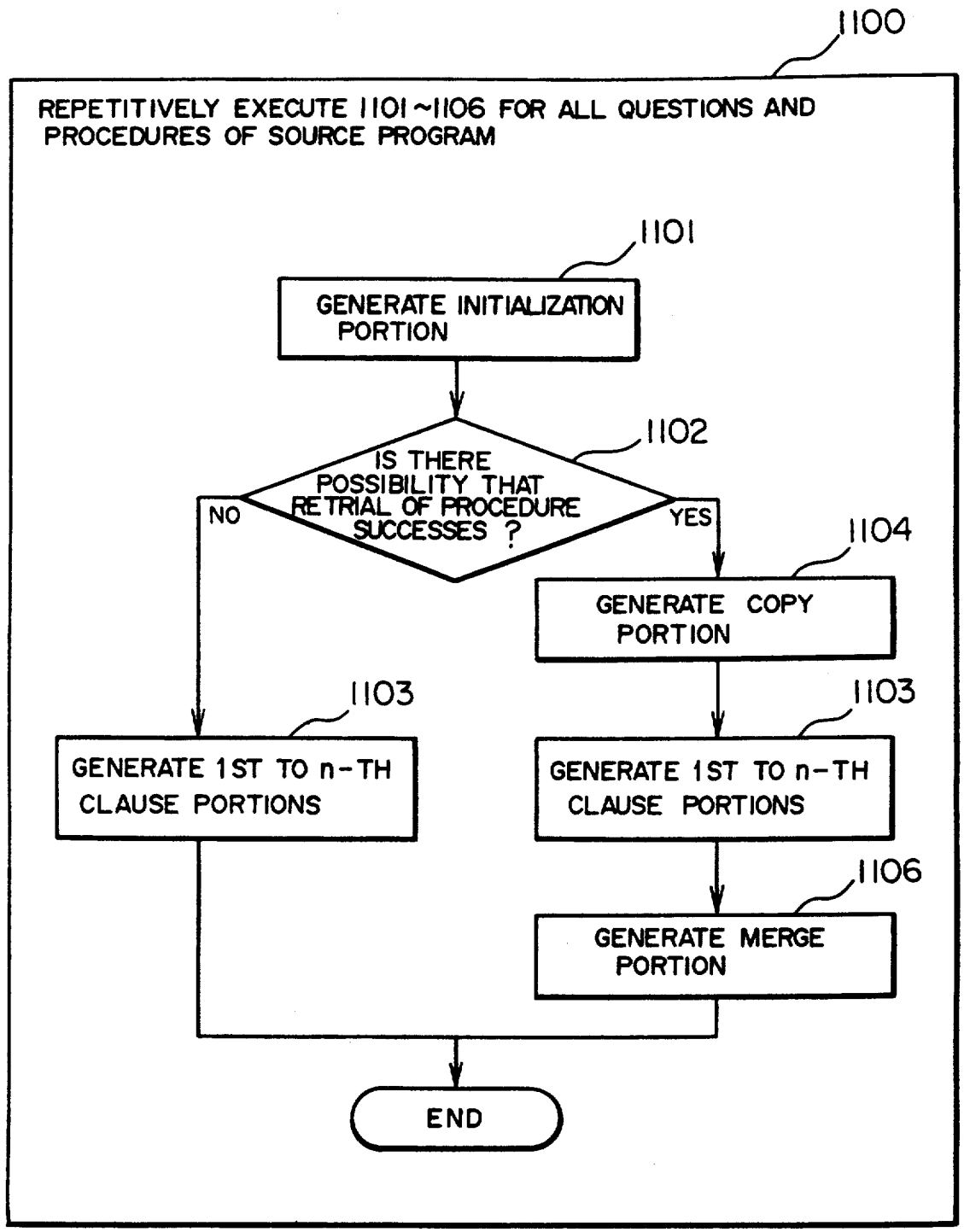

METHOD FOR DETERMINING WHETHER DATA SIGNALS OF A FIRST SET ARE RELATED TO DATA SIGNAL OF A SECOND SET

This is a continuation of application Ser. No. 006,425, filed Jan. 23, 1987, now abandoned.

BACKGROUND OF THE INVENTION

The present invention relates to a method of compiling a program written in a logic programming language for computers represented by PROLOG and intends high speed execution of artificial intelligence (AI) programs by a pipelined vector processor or a parallel vector processor.

Representation of a program by a logic programming language is first explained.

In the logic programming language, a proposition in predicate logic (called clause in the logic programming language) is described as follows.

bird (swallow).      ① fly(X):—bird(X).      ②

The clause ① means "A swallow is a bird." The clause ② means "If X is a bird, X flies in the sky." The head name in the clause (bird in ①, and fly in ②) is called a procedure name or predicate name. The set of clauses having the same predicate name is called a procedure or predicate. If the program consists of only the clauses ① and ②, each of the clauses ① and ② is a procedure by itself.

A name whose initial letter is uppercase (X in the above example) represents a logical variable and it represents an unspecified object. On the other hand, a name whose initial letter is lowercase (swallow in the above example) is called a constant and it represents a specific object or number. Unlike a variable in a programming language such as FORTRAN, the value of the logical variable, once it is set, cannot be changed unless failure takes place. That is, assignment in a conventional sense is not allowed.

Assuming that ① and ② are given to a logic programming language system as a program, and assuming that the following question ③ is made. The concept "question" corresponds to "main program" in FORTRAN language.

?-fly (swallow).      ③

The result of question ③ is true. The question means "Does a swallow fly in the sky?".

The program may be used as follows.

?-fly (Y).      ④

The result is Y=swallow. The question ④ means "What flies in the sky?" and fly (swallow) means a swallow flies in the sky" or "It is a swallow that flies in the sky".

The fly (swallow) in the question ③ and the fly(Y) in the question ④ are called procedure calls of procedure "fly". Similarly, the bird (X) in the clause ② is a procedure call of procedure "bird". The procedure call corresponds to a subroutine call in FORTORAN language.

The attribute that the program whose input and output are exchanged is executable as in question ③ and the question ④ is called bidirectionality (An argument for "fly" is an input in the question ③ and an output in the question ④.) The bidirectionality is one of the characteristics of the logic programming language program.

If the following program ⑤ is added to ① and ②, the solution of the question ④ is Y=swallow and Y=-hen. (In this case, the procedure "bird" comprises two clauses.)

bird (hen).      ⑤

Such a plurality of solutions is also a characteristic of the logic programming language program.

Before the question "?-fly(Y)" is executed, the logical variable Y is unspecified, but it is bound to a constant "swallow" during the execution. When the logical variable is bound to a specific object, it is said "instantiated" and when it is not bound to a specific object, it is said "uninstantiated".

Sequential execution of the logic programming language is now explained.

As an example, a program 200 shown in FIG. 2 is used. The meaning of the program 200 is first explained. Clauses 201-205 mean as follows.

Clause 202 "A swallow is a bird."
Clause 203 "A hen is a bird."
Clause 204 "A penguin cannot fly in the sky."
Clause 205 "A hen cannot fly in the sky."

Procedure bird consists of clauses 201, 202 and 203 and procedure cannot Fly consists of clauses 204 and 205.

Question 206 means "Output all those birds which cannot fly in the sky." More exactly, it means "Output all possible solutions of a logical variable X which meets bird(X) and cannot Fly(X), and if there is no more solution, output "false". The question 206 comprises four procedure calls, "bird(X)", "cannot Fly(X)", "write (X)" and "fail".

FIG. 3 illustrates the sequential execution of question 206. The sequential execution of the logic programming language is explained with reference to FIG. 3. While procedure call "bird" 301 is executed, the logical variable X is uninstantiated. There are three clauses 201-203 which match (unify) "bird(X)" and the first one, clause 201 is selected. As a result, the logical variable X is instantiated to "penguin". Then, the procedure call "cannot Fly" 302 is executed. Since the logical variable X has been instantiated to "penguin", only the clause 204 in the clauses 204-205 matches. Then, the procedure call "write" 303 is executed. Since the logical variable X has been instantiated to the constant "penguin", one solution "penguin" is displayed on an output device. Then, the procedure call "fail" 304 is executed.

Since the procedure "fail" means "Search another solution", another solution of the procedure call "cannot Fly" is searched. This step is called retrial of the procedure "cannot Fly". Since there is no other solution so long as X is instantiated to the constant "penguin", the procedure "cannot Fly" does not return a result to the argument X by the retrial. Accordingly, the state of the logical variable X is restored to that prior to 301, that is, to an uninstantiated state and the procedure "bird" is retrial (305). That is, other solution of the procedure call "bird" is searched. The step to restore the logical variable to its previous value and retry the procedure call is called "backtrack". In the step 305, a solution is found and the logical variable X is instantiated to the constant "swallow". Then, the procedure call "cannot Fly" 306 is executed. Since the logical variable X has been instantiated to the constant "swallow", there is no matchable clause in clauses 204-205. Accordingly, the trial fails, X is reset to the uninstantiated state and the procedure call "bird" is again retried (307).

The steps 307-310 are executed in the same manner as the steps 301-304 and the explanation thereof is omitted. Finally, X is again reset to the uninstantiated state and the procedure "bird" is retried (311). Since there is no other solution, the result to the question 206 is false and the execution is terminated.

A compiling method for generating a program which is sequentially executed is disclosed in "Implementing PROLOG—Compiling Predicate Logic Programs", D.A.1. Research Report No. 39, Department of Artificial Intelligence, University of Edinburgh.

As described in the Japanese Patent Application document 61-65337 (filed on Sept. 7, 1984), in order to materially increase a speed of execution of the logic programming language, a high speed vector operation mechanism of a pipelined vector processor or a parallel vector processor can be used. The vector operation means an operation of the same type to each of vectors or data comprising plural elements of the same type. In a vector operation, a data structure (or array) in which elements are arranged in a continuous area at a constant stride is usually a target of operation. Here, an operation of the same type to each element of a list is also called the vector operation. The vector processor means a processor having vector instructions.

An example of the vector processor is Hitachi S-810. The processor of S-810 is explained with reference to FIG. 4. In S-810, an array data can be processed at a high speed by a pipeline mechanism shown in FIG. 4. For example, data contained in array data 401 on a main memory 421 are sequentially loaded to a vector register 403 by a load pipeline 402. The load pipeline means a hardware for processing the array data which can load the entire array data (or a portion thereof) at a short pitch. The vector register means a large capacity register which can hold the entire array data (or a portion thereof). Data contained in array data 404 are loaded to the vector register 406 by a load pipeline 405, in the same manner as that for 401-403.

When a first element is written into the vector register, it can be immediately read. Accordingly, when first data are written into the vector registers 403 and 406, the processing by a processor 407 is immediately started and the processing is sequentially carried out. A result of the processing is written into a vector register 408. The processor is a pipelined processor designed for array processing and it can process at the same pitch as the vector registers 403 and 406. When a first data is written into the vector register 408, the storing into the array data 410 is immediately started by a store pipeline 409 and the data are sequentially stored.

Since the array data are loaded, processed and stored in the pipeline fashion in the vector processor, the array data can be processed much faster than by a general purpose computer.

The execution method of the logic programming language program in the vector processor is shown in the above JP-A and "High Speed Execution of PROLOG by A Supercomputer" 26th Programming, Symposium Report, pages 47-56, 1985 in Japanese. A method for executing the above example in the vector processor is explained with reference to FIG. 5.

FIG. 5 shows a method for executing the program of FIG. 2 by the vector processor. A procedure call "bird" 501 obtains all the solutions which meet a procedure "bird" to form array data 502. The processing corresponding to the steps 301, 305, 307 and 311 of FIG. 3 is carried out by vector operation, and resulting X is given by array data 502. Accordingly, the array data 502 comprises three constants, "penguin", "swallow" and "hen". The number of elements, "3", is stored at the top of the array data 502. The number of elements is stored at the top of each array data. This data is not regarded as an element of the array. This is also true for the embodiments to be described later. For example, the first element of the array data 502 is not "3" but "penguin", the second element is "swallow" and the third element is "hen".

A procedure call "cannot Fly" 503 reads in the array data 502 and detects all solutions which meet the procedure "cannot Fly" to form array data 504. The step 302 of FIG. 3 is carried out for the element "penguin" of the array data 502, the step 306 of FIG. 3 is carried out for the element "swallow", and the step 308 of FIG. 3 is carried out for the element "hen". Thus, it is determined that X which meets "cannot Fly(X)" is "penguin" and "hen". Array data 504 comprising those two elements is defined. Accordingly, the array data 504 comprises two constants, "penguin" and "hen".

A procedure call "write" 505 reads in the array data 504 and displays all elements thereof on an output device. That is, the steps 303 and 309 of FIG. 3 are carried out. Thus, "penguin" and "hen" are displayed on the output device.

Finally, a procedure call 506 is executed. Since all solutions have been obtained for "bird" 501 and "cannot Fly" 503, the result for the question 201 is false and the execution is terminated.

Prior to the explanation of the problem, a program 600 shown in FIG. 6 is explained.

The program 600 determines square numbers between 0 and 3, inclusive. The square number means a number whose root is an integer. Because $0=0^2$ and $1=1^2$, the solution is "0" and "1", respectively. The program in FIG. 6 consists of three portions, a question 601, a procedure "root" 602 and a procedure "digit" 603.

In the question 601, the procedure "root" 602 and the procedure "digit" 603 are called to calculate a root and it is printed out. The question 601 comprises four portions, "digit (B)", "root (B, A)", "write (B)" and "fail". The "digit (B)" calls the procedure "digit" by using a logical variable B as an argument. The "root (B, A)" calls the procedure "root" by using the logical variables B and A as arguments. The "write (B)" calls a built-in procedure "write" to print out the value of the logical variable B. The built-in procedure means a procedure which is previously prepared in the logic programming language system and can be used without supplying a processing method by the user. The procedure "fail" is the built-in procedure. In the procedure "fail", the procedures "root (B, A)" and "digit (B)" are retried until all solutions are obtained and "digit (B)", "root (B, A)" and "Write (B)" are repeatedly executed.

The procedure "root" 602 comprises only one clause. The clause 602 comprises a head "root (Y, X)", a body "digit (X), Y is X * X" and an operator ":—". The head indicates a procedure name and an argument. The procedure "root" 602 receives arguments Y and X. In the call of "root" in the query 601, Y=B and X =A. The body of the procedure root 602 comprises two portions, "digit (X)" and "Y is X * X". The portion "digit (X)"

calls the procedure "digit" by using the logical variable X as an argument. "Y is X * X" is a built-in procedure in which square of the logical variable X is compared with Y. The portion "digit (X)" is retried when a retry is caused by the procedure call "fail" of the query 601, and different values of arguments are produced.

The procedure "digit" 603 comprises four clauses. After the first clause "digit (1)" has been executed, an argument in the call of "digit" is set to "1". The same is true for the second to the fourth clauses. The program 600 of FIG. 4 has thus been explained.

A problem encountered in executing the program 600 of FIG. 6 in a prior art vector processor is explained, with comparison to the program 200 of FIG. 2.

In the program 200 of FIG. 2, the procedure "bird" produces a different argument for each call and each retry. Thus, the procedure call "cannot Fly (X)" is called plural times (N times). However, in no case, the retrial of the procedure "cannot Fly" successes nor the value is returned to the argument. (In the call, the trial is successed and the value is returned to the argument, or it is failed.) In the execution method of FIG. 5, plural values, that is, "penguin", "swallow" and "hen" are given to array data 502 corresponding to the logical variable X by the execution of "bird" 501, and the elements "penguin" and "hen" produces one solution, respectively, and "swallow" produces no solution. As a result, array data 504 is produced. When each array element before processing corresponds to one or zero array element after processing, the method shown in the above JP-A may be used. It may be readily implemented by combining vector instructions of the vector processor such as S-810.

This is not true for the program 600 of FIG. 6. Because the procedure call "digit (Y)" produces a different argument data by each call and each retrial, the procedure call "digit (X)" is called plural times (N times). Thus, unlike the program 200, a different argument data is produced by each call and each retrial. Accordingly, the second array data having elements of logical variables Y before processing does not match to first array data having elements of argument data X after processing. However, in the conventional vector processor, there is no vector instruction which processes the non-corresponding elements. Accordingly, the program 600 cannot be executed by the method shown in the above JP-A. In the above article (2), procedure "select" in a program which solves a puzzle called N queens problem is cited as an example of generation of plural array elements from each element of the array data, and input data and output data therefor are explained. However, a program for computation is not given.

SUMMARY OF THE INVENTION

The above problems are resolved in a compiler which converts a source program in a logic programming language to an object program, by converting a program which comprises (1) a first source program portion which is executed by call or retrial and carries out first processing for each execution to produce argument data; and (2) a second source program portion which (a) indicates call and plural times of retrial of the first source program portion, (b) carries out second processing to a plurality of argument data produced from the first source program portion by the call and the retrial, and (c) repeats the steps (a) and (b) N times; into (3) a first object program portion which (a) sequentially executes the first processing by a number of times designated by input data, N data at a time and (b) generates first array data having argument data obtained by the processing as respective elements, and (4) a second object code portion which (c) executes the first object program by designating the number N of times of repetition and (d) sequentially executing second processing for the elements of the first array data outputted by the first object program portion.

The method of the present invention accomplishes the above objects by providing a method for controlling a vector processor to detect whether a value of each data signal among a first set of data has a specific relation with a value of one of a second set of data signals. The vector processor includes an operation unit for performing arithmetical and logical operations in a pipeline manner on vector data. First vector data is formed from the first set of data signals including groups of data signals wherein the groups respectively correspond to the data signals of the first set and the data signals of each group are equal to one data signal corresponding to a group among the data signals belonging to the firs set. A total number of data signals of the groups is equal to a total of the data signals belonging to the second set of data signals. Second vector data is also formed from the second set of data signals including groups of data signals wherein data signals in each group are respectively equal to the data signals belonging to the second set of data signals. The number of the groups is equal to the number of data signals belonging to the first set of data signals. The operation of the operation unit is controlled so that the operation unit detects whether the a data of each data signal of the first vector data has a specified relation with a value of a corresponding data signal of the second vector data which is equal in vector element number to each data signal of the first vector data. Thereby, the operation unit is caused to provide third vector data including result data signals each indicative of a result of the detection.

DESCRIPTION OF THE DRAWINGS

FIG. 2 shows a logic programming language program used to explain prior art technique, FIG. 10 shows a flow chart of a compiler which converts a logic programming language program to the object program.

DESCRIPTION OF THE PREFERRED EMBODIMENTS (a) Description of Vector Compare Instruction and Vector Compress Instruction As preparation for explanation of the execution method, a vector equality compare instruction and a vector compress instruction which are vector operation instruction used in the execution are explained.

Figure 7:
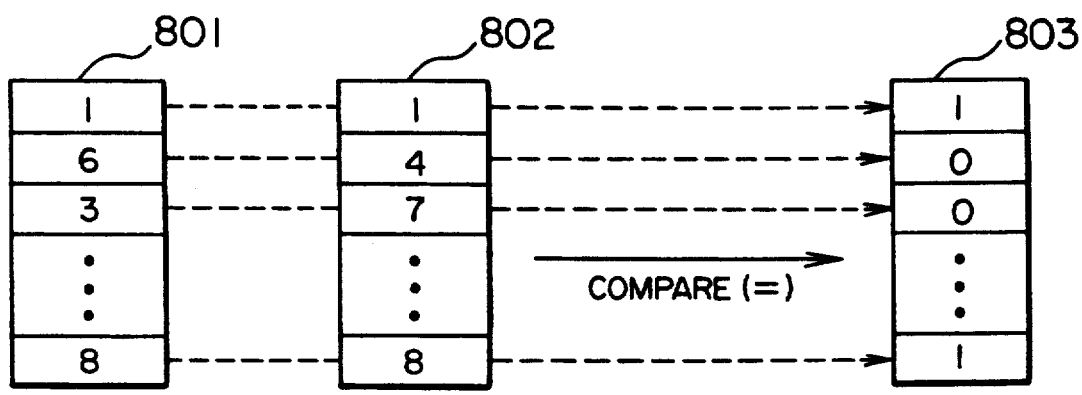
FIG. 7 illustrates an operation of a vector equality compare instruction.

FIG. 7 shows an operation of the vector equality compare instruction. The vector equality compare instruction compares the elements of array data 801 and 802 contained in vector register 801 specified by an operand, and stores the result in vector mask register 803. The vector mask register stores array data whose elements are single-bit logical values. In FIG. 7, the logical value is represented by "1" or "0". The element of the vector mask register 803 corresponding to the equal elements is set to "1", and the element corresponding to unequal elements is set to "0". In FIG. 7, since the first elements of both vector registers 801 and 802 are "1", the first element of the vector mask register 803 is "1". Since the second elements of the vector registers 801 and 802 are "6" and "4" and are not equal, the second element of the vector mask register 803 is "0". The same rule applies to the subsequent elements.

The vector processor S-810 is provided with the vector equality compare instruction VCEQ.

Figure 8:
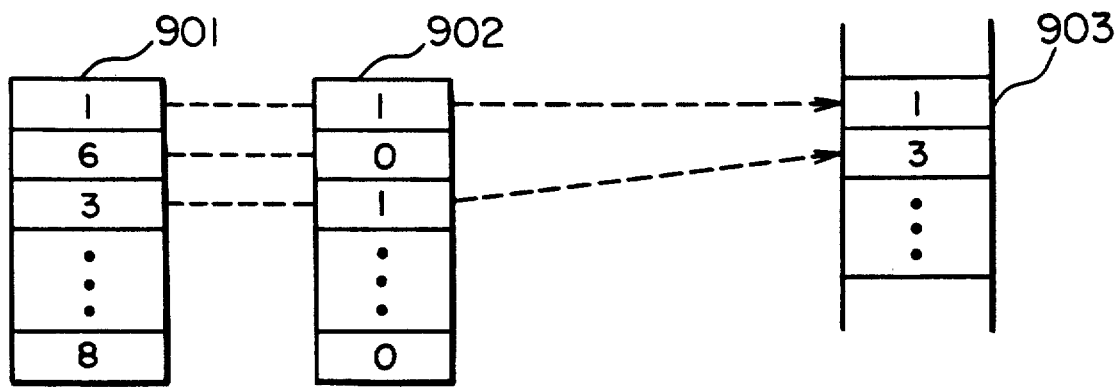
FIG. 8 illustrates an operation of a vector compression instruction.
Figure 9A:
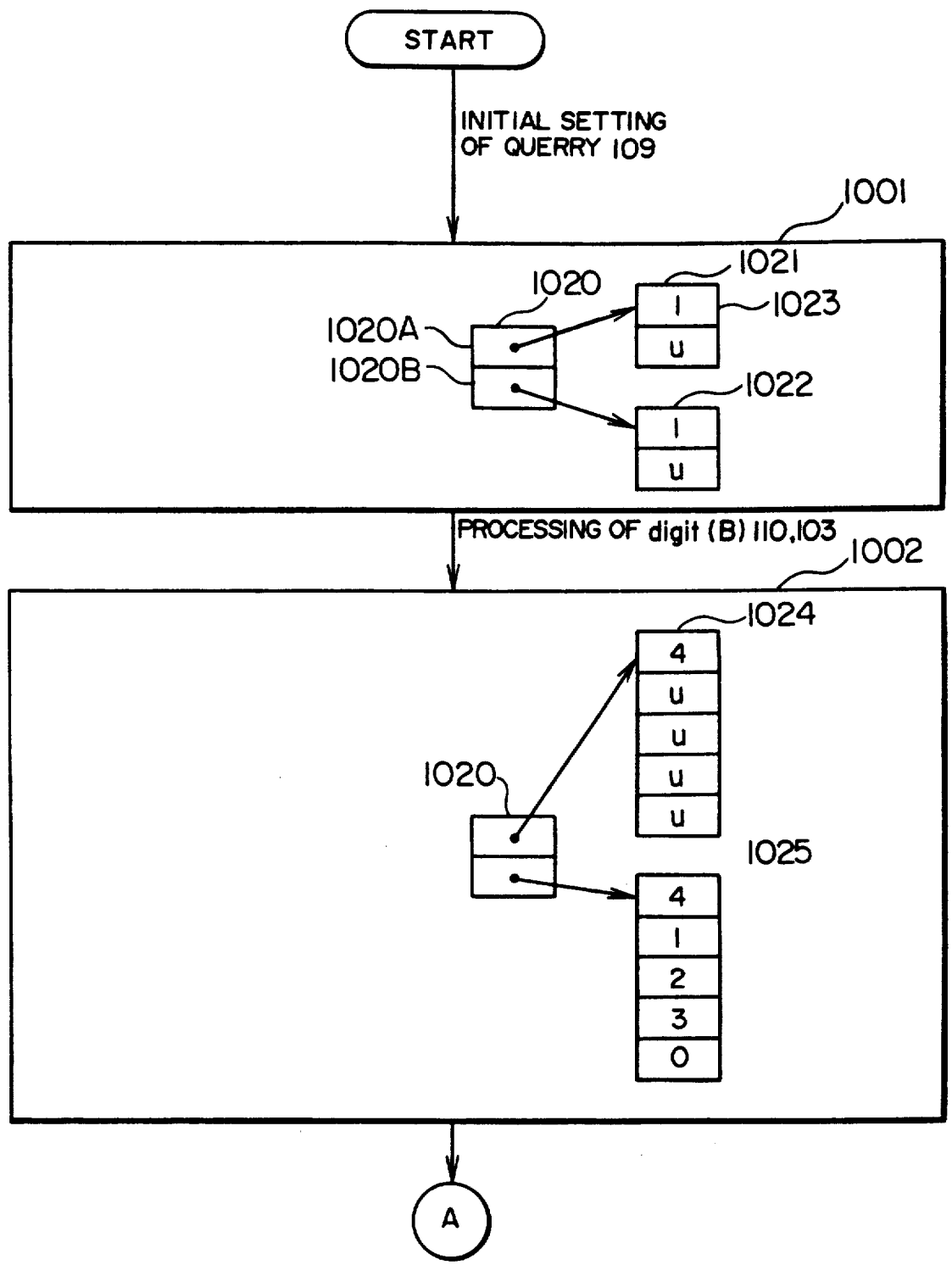
FIGS. 9A-9G show an execution procedure of the object program of FIG. 1 in the vector processor.
Figure 9B:
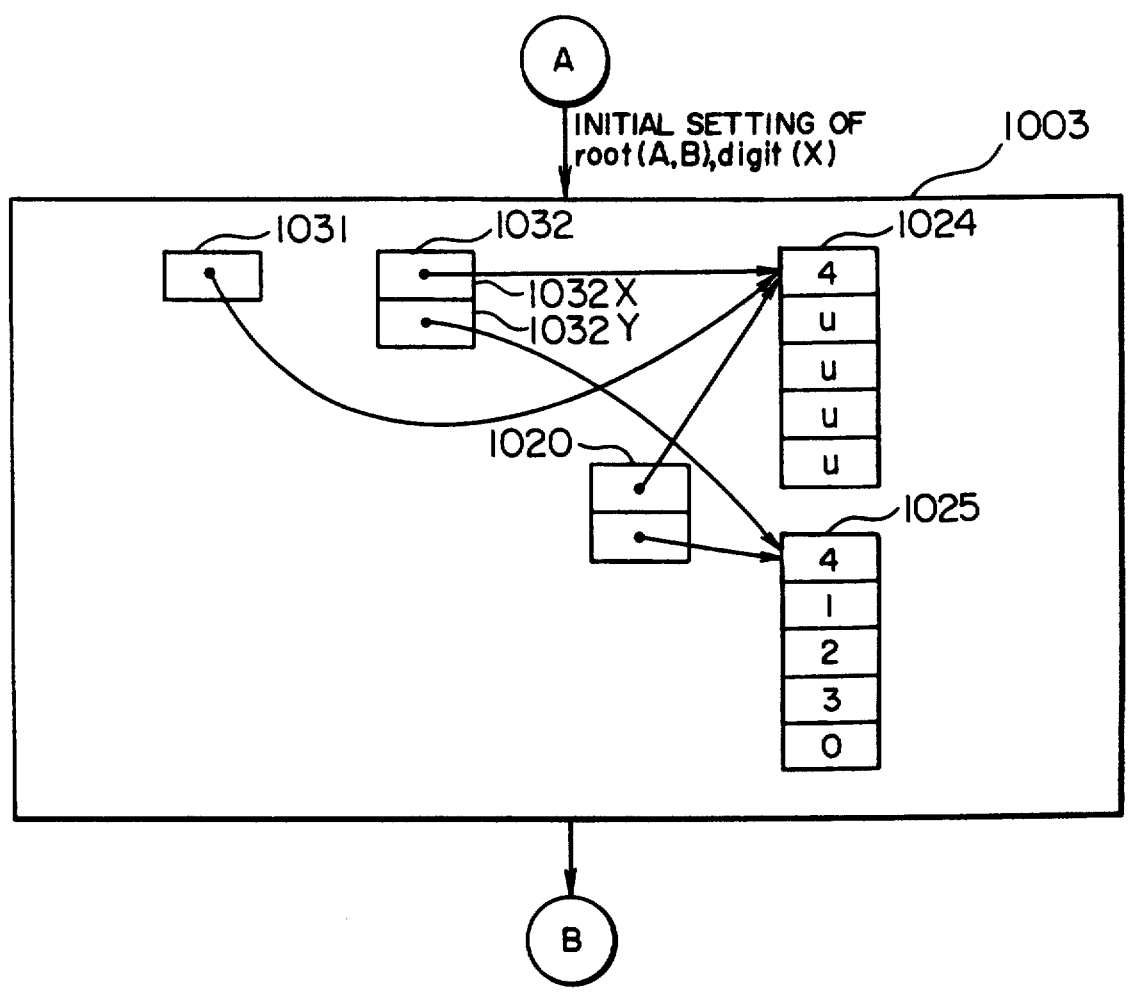
Figure 9C:
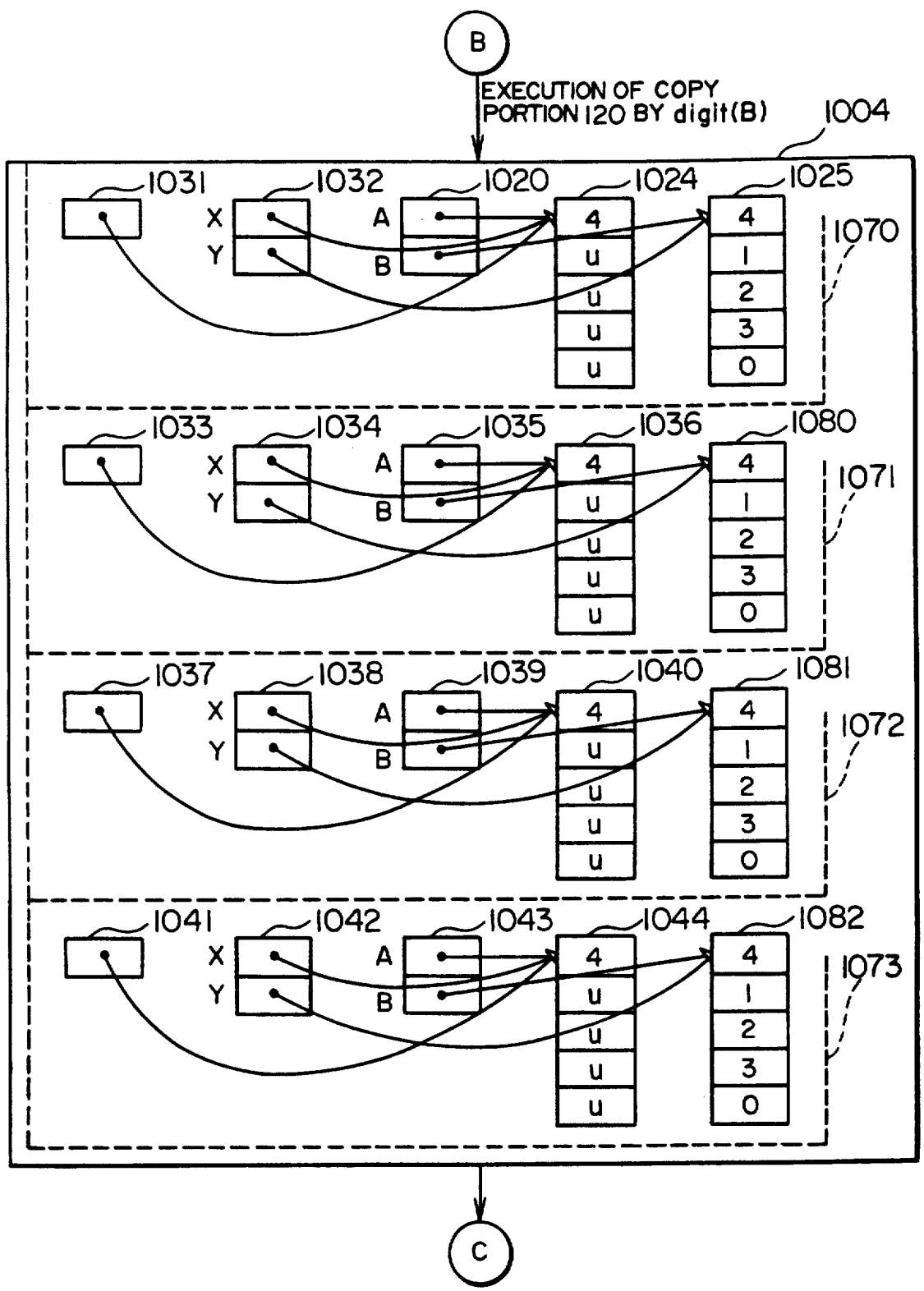
Figure 9D:
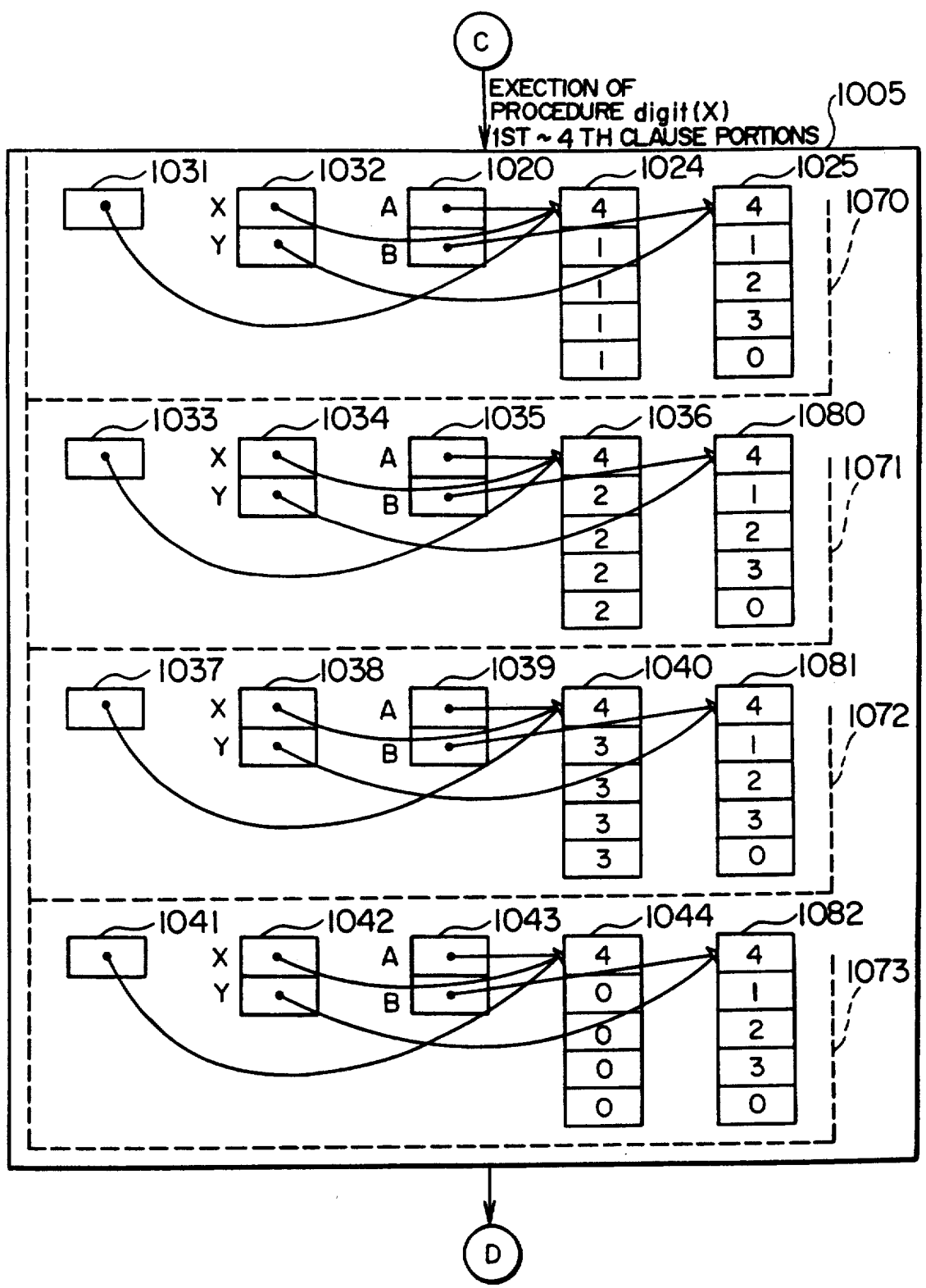
Figure 9E:
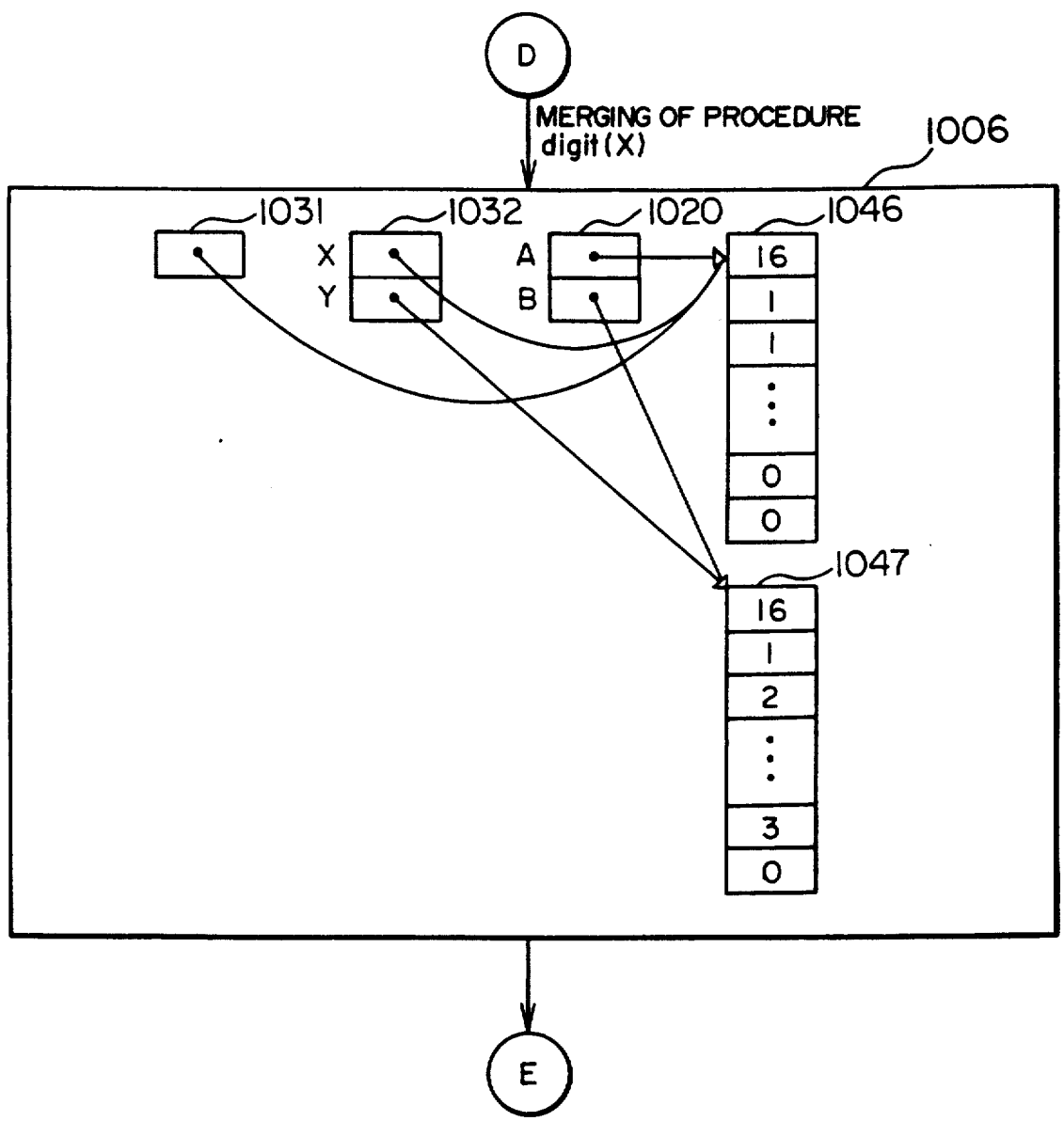
Figure 9F:
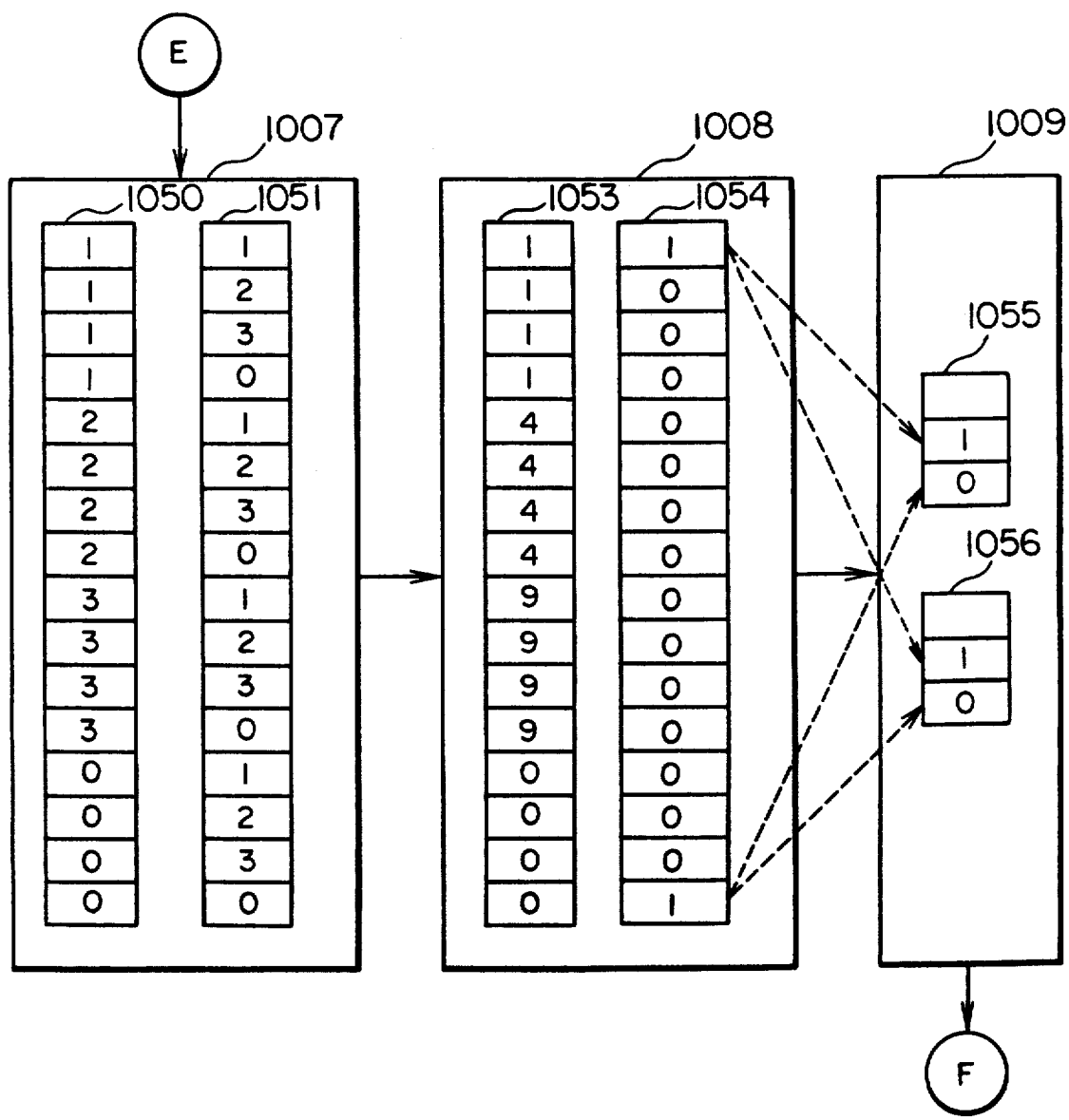
Figure 9G:
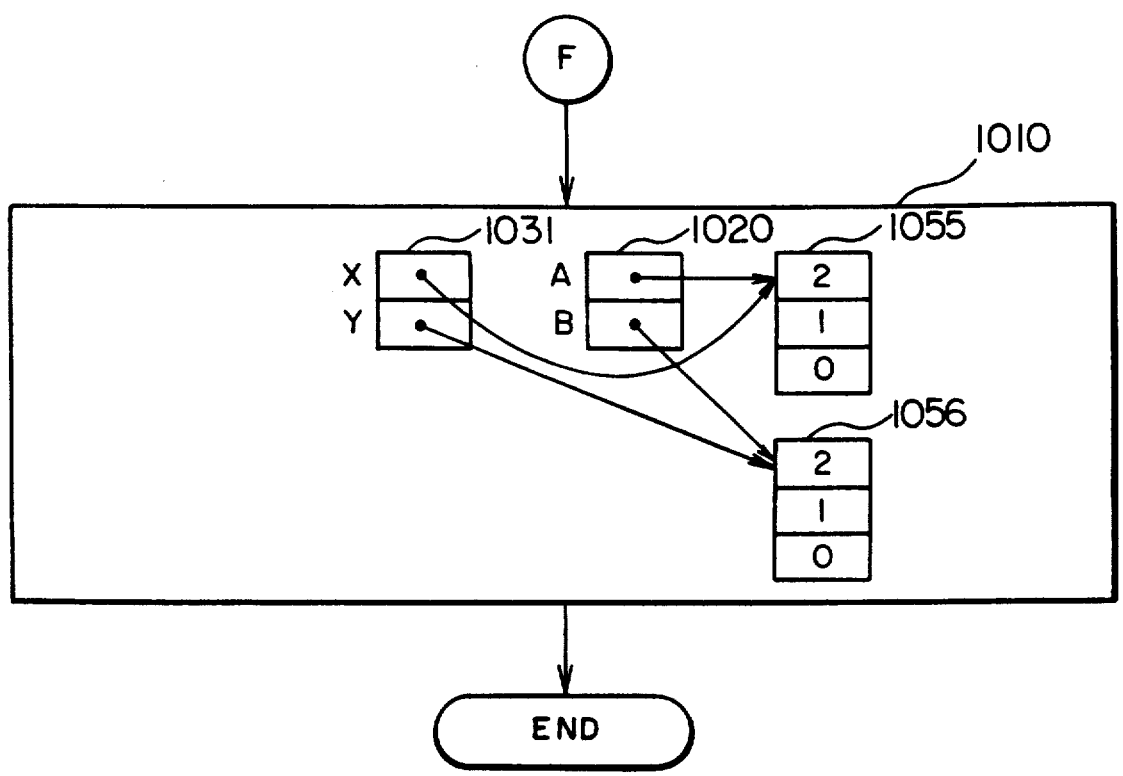

FIG. 8 shows an operation of the vector compress instruction. The vector compress instruction compresses a content of vector register 901 specified by an operand in accordance with a content of a vector mask register 902 and stores the result into a vector register 903. In FIG. 8, since the first element of the vector mask register 902 is "1", the first element of the vector register 901 is stored into main storage 421 or the vector register 903. Since the second element of the vector mask register 902 is "0", the second element of the vector register 901 is not stored. Since the third element of the vector mask register 902 is "1", the third element, of the vector register 901 is stored contiguously. That is, it is stored into the area of the main storage 421 or the vector register 903 corresponding to the second element. The same rule applies to the subsequent elements.

The vector processor S-810 is provided with vector compress instructions VSTC and VSTDC for storing into the main storage 421.

(b) Object Program

The compiler compiles the program 600 of FIG. 6 to the object program 100 of FIG. 1 in a method to be described later. The compiling may be done on a general purpose computer.

Figure 1:
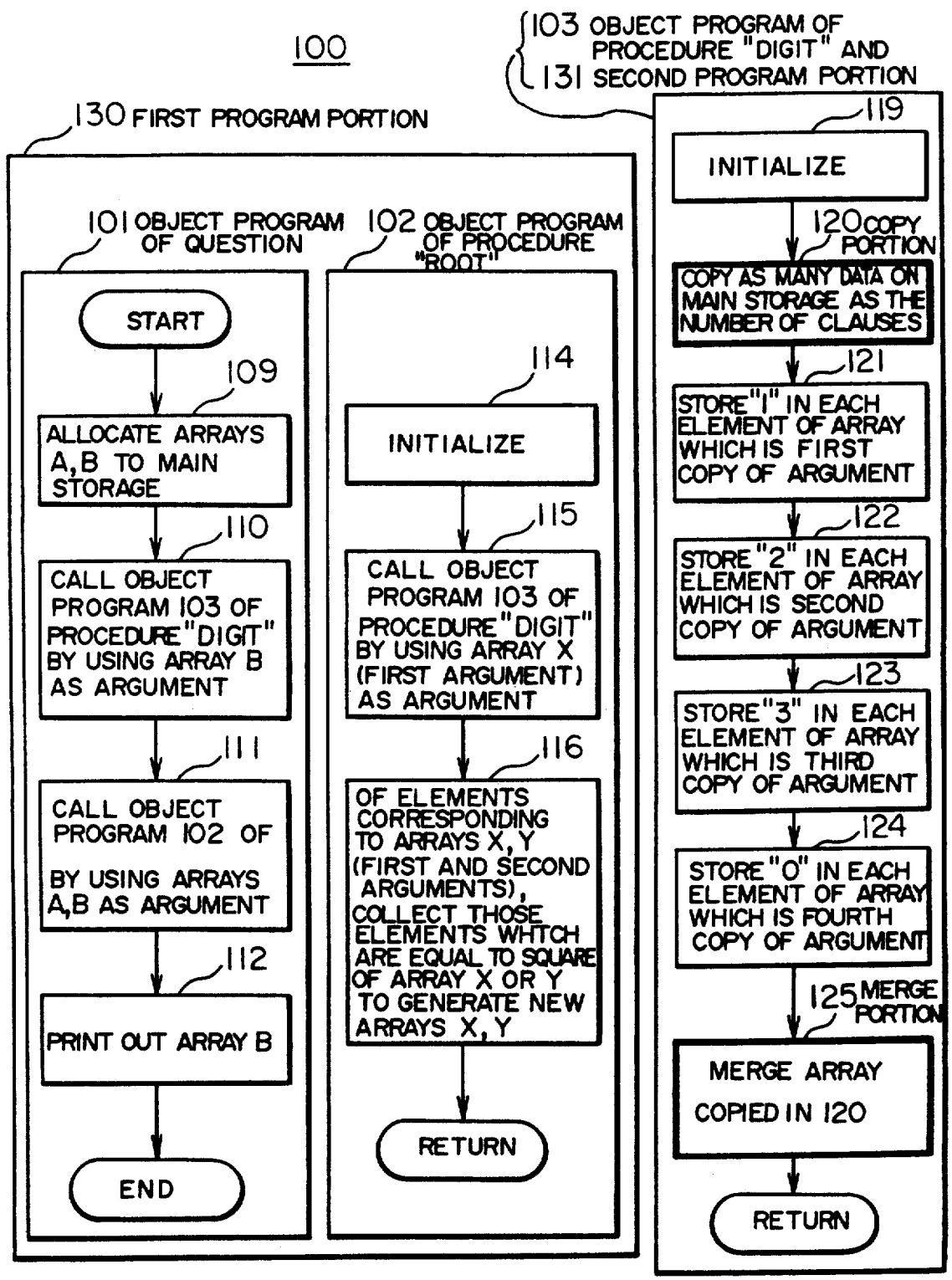
FIG. 1 shows an object program generated by inputting a logic programming language program shown in FIG. 6 to an compiler of the present invention.
Figure 3:
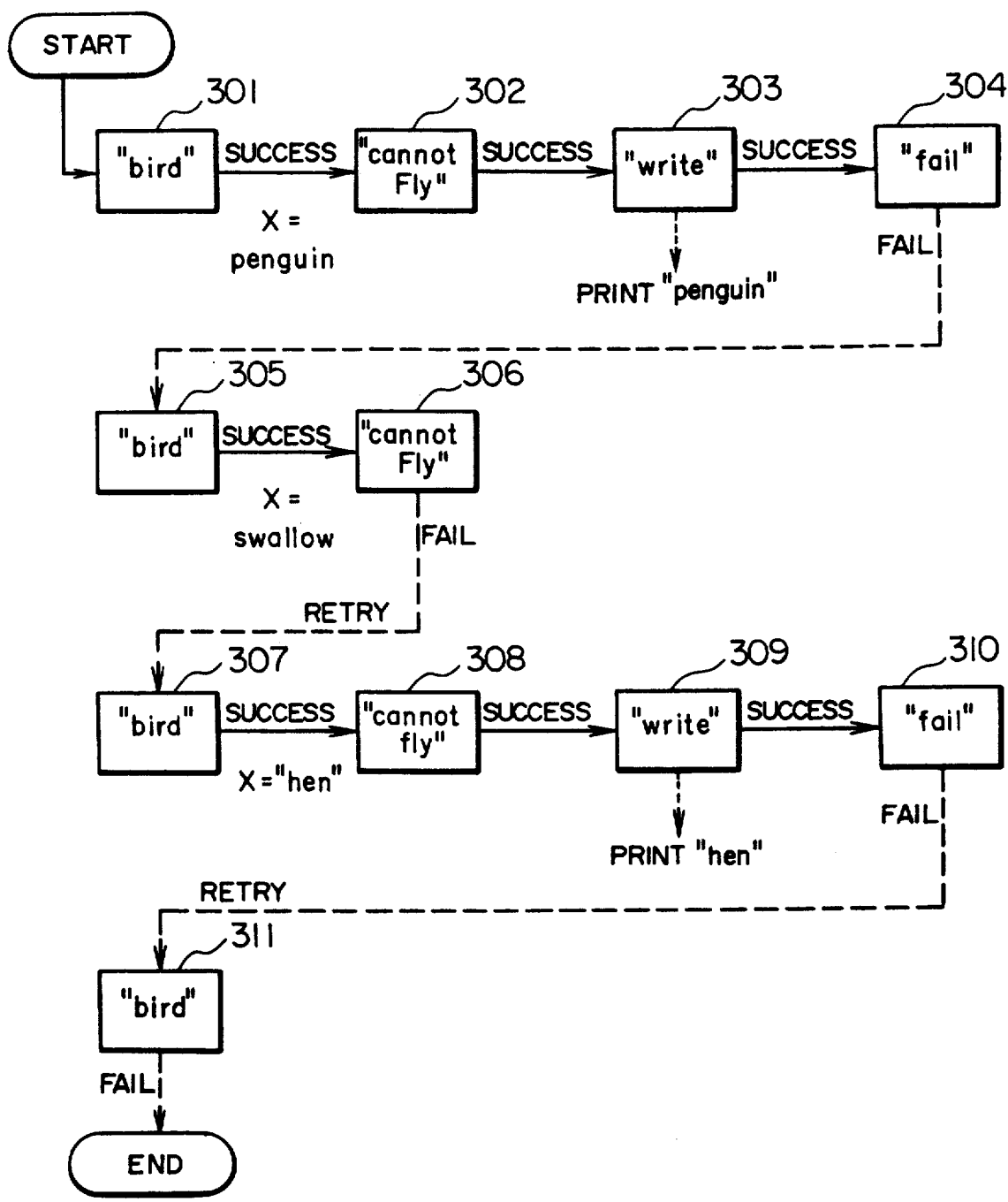
FIG. 3 shows a flow chart of an execution procedure of the program shown in FIG. 2 in a general purpose computer.
Figure 4:
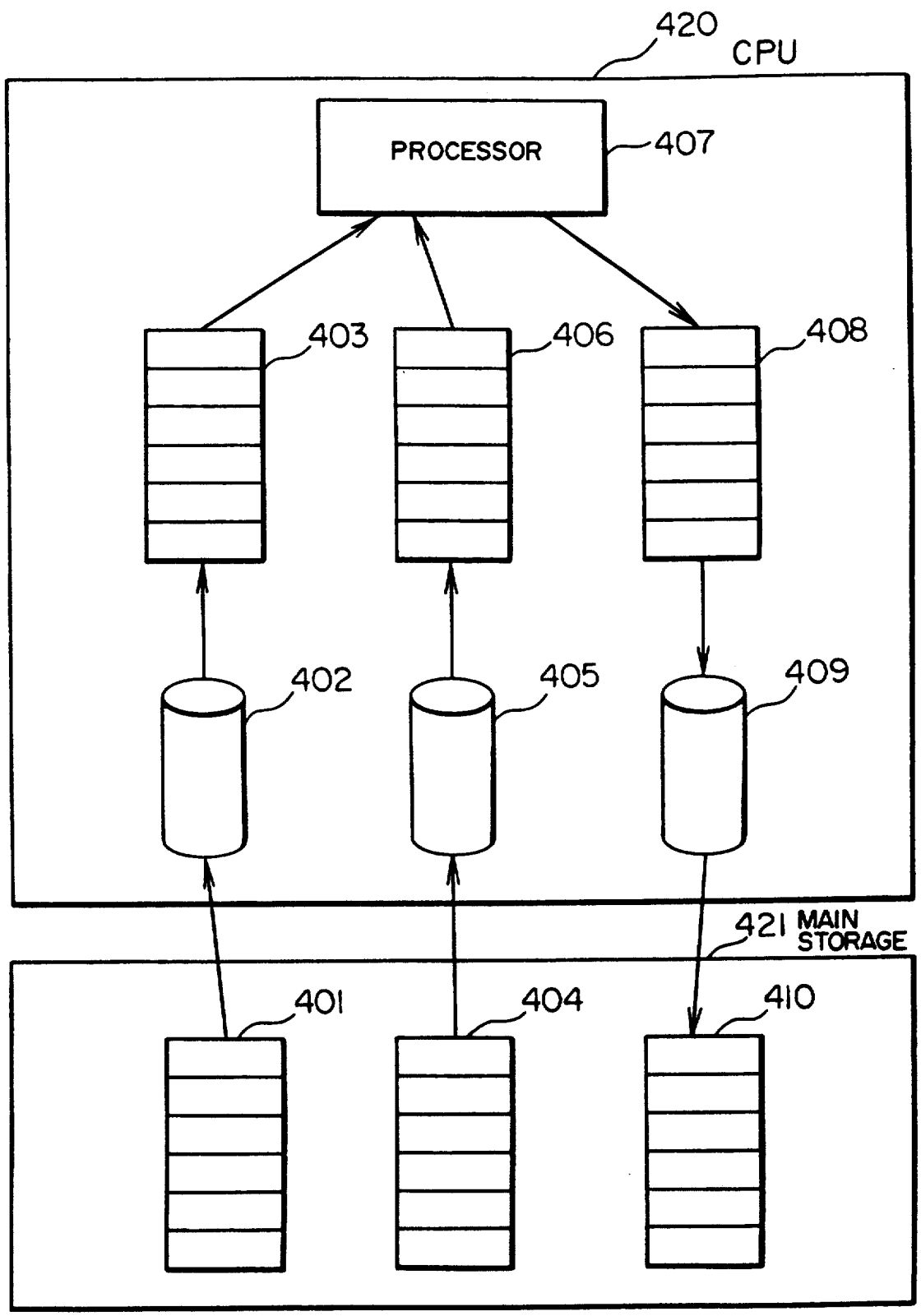
FIG. 4 shows a block diagram of a vector processor for executing the object program of FIG. 1.
Figure 5:
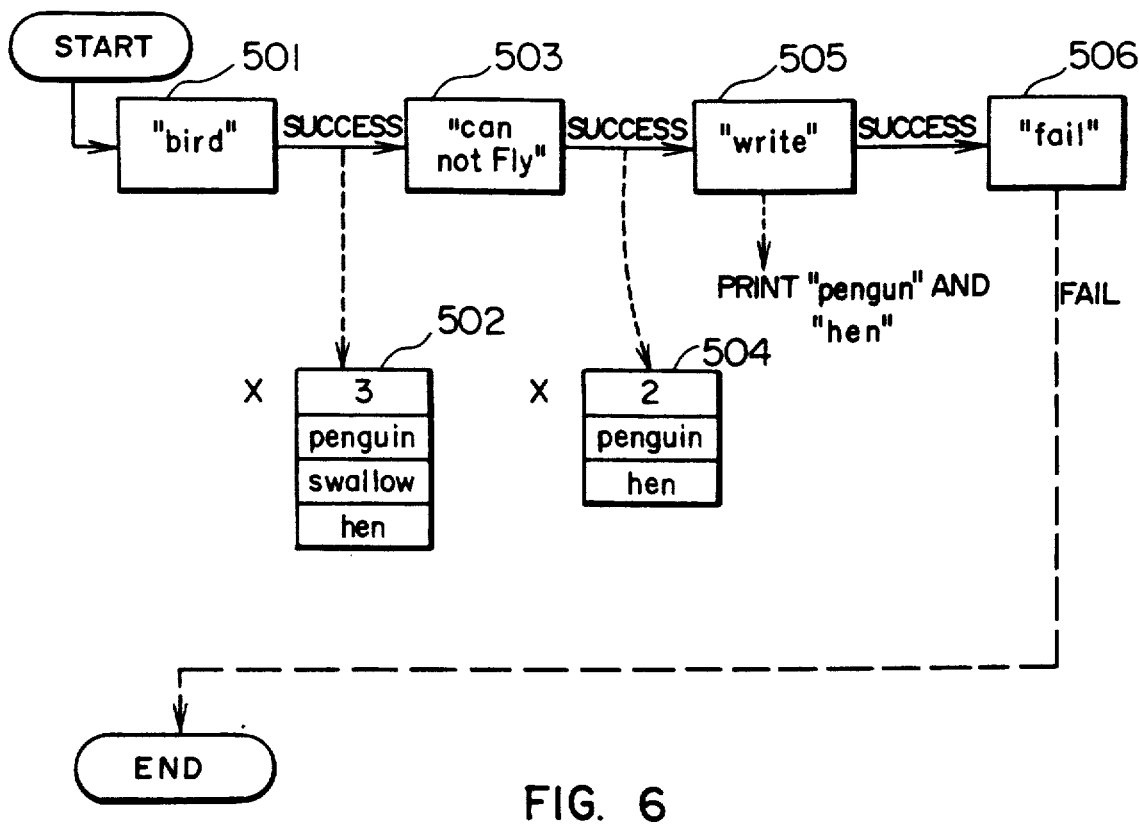
FIG. 5 shows a flow chart of an execution procedure of the program shown in FIG. 2 in the vector processor.

A construction of the object program 100 shown in FIG. 1 is first explained. The object program 100 comprises the following three portions.

(1) An object program 101 of a question resulting from compiling of the question 601.

(2) An object program 102 of a procedure "root" resulting from compiling of the procedure "root" 602.

(3) An object program 103 of a procedure "digit" resulting from compiling of the procedure "digit" 603.

Of those, only the procedure "digit" generates, during processing, plural array elements from one element of array data which is present before processing. The object programs 101-103 comprise the following portions.

(1) Object program 101 of the question resulting from compiling of the question 601

Figure 6:
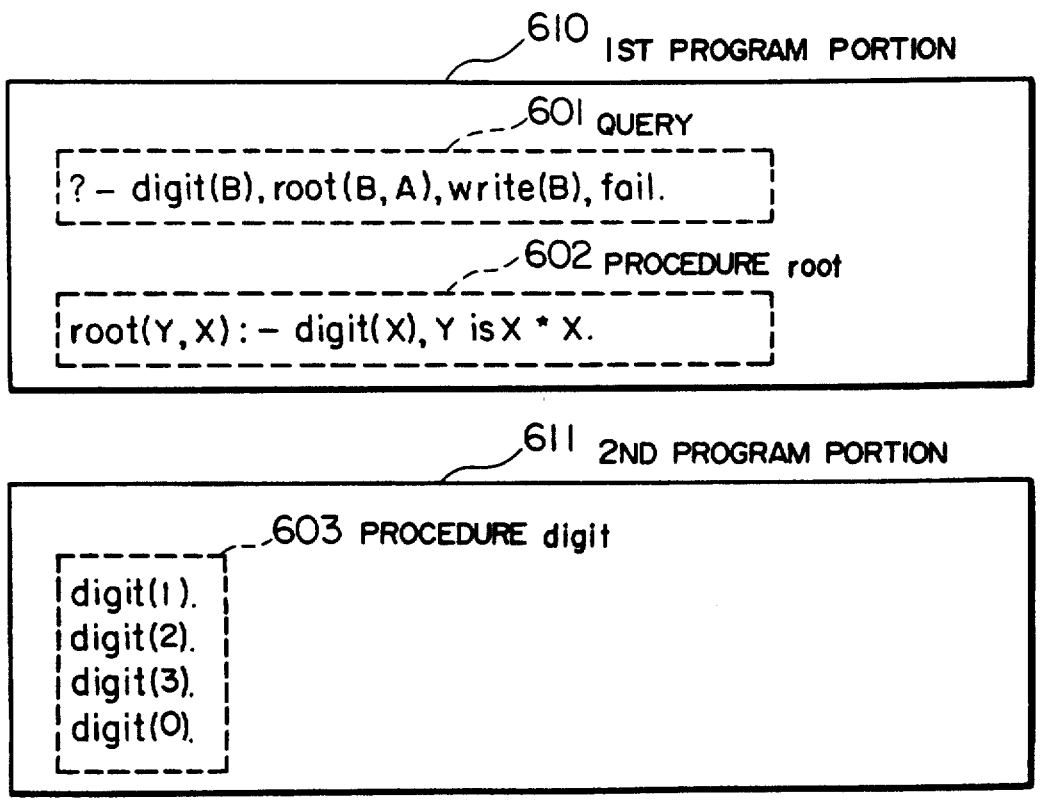
FIG. 6 shows a logic programming language program in an embodiment of the present invention.

(1.1) A question initialization portion 109 having no directly corresponding portion in the logic programming language program of FIG. 6.

(1.2) A "digit (B)" call portion 110 resulting from compiling of the procedure call "digit (B)" in the question 601.

(1.3) A "root (B, A)" call portion 111 resulting from compiling of the procedure call "root (B, A)" in the question 601.

(1.4) A question built-in procedure processing portion 112 resulting from compiling the built-in procedure "write" in the question 601.

(2) Object program 102 of the procedure "root" resulting from compiling the procedure "root" 602.

(2.1) A "root" initiatization portion 114 having no directly corresponding portion in the logic programming language program of FIG. 6.

(2.2) A "digit (X)" call portion 115 resulting from compiling the procedure call "digit (X)" in a body of the procedure "root" 602.

(2.3) "Root" built-in procedure processing portion 116 resulting from the built-in procedure "Y is X * X" in a body of the procedure "root" 602.

In compiling the logic programming language program which contains a structure such as a list in a temporary argument, argument unification processing for pattern-matching of the argument is necessary in addition to the portions 115-116. In the program in FIG. 6, the temporary argument (Y, X at the top of the clause 602) is not a logical variable and hence the argument unification processing portion is not necessary. Since the argument unification processing portion may be handled in the same manner as the "root" built-in procedure processing portion 116, an embodiment thereof is not shown.

(3) Object program 103 of the procedure "digit" resulting from compiling of the procedure "digit" 603.

(3.1) A "digit" initialization portion 119 having no directly corresponding portion in the logic programming language program of FIG. 6.

(3.2) A copy portion 120 for copying as many data on the main storage 421 as the number of clauses.

(3.3) A first clause portion 121 corresponding to the first clause of the procedure "digit" 603, a second clause portion 122 corresponding to the second clause, a third clause portion 123 corresponding to the third clause, and a fourth clause portion 124 corresponding to the fourth clause.

(3.4) A merge portion 125 for merging the array data copied by the copy portion 120. (c) Execution procedure of the object program 100

The execution procedure of the object program 100 of FIG. 1 is explained with reference to FIGS. 9A-9G.

The question initialization portion 109 is first executed to generate data 1001. All variable data areas used in the object program 101 of the question, that is, a pointer area 1020A of array data corresponding to a variable A and a pointer area 1020B of array data corresponding to a logical variable B, are allocated to the main storage 421. Array data areas 1021 and 1022 both of which have one element are allocated to the main storage 421 and start addresses thereof are stored in a variable area 1020. The number of element "1" is stored at the top 1023 of the array data area 1021. The same is true for the array data area 1022. A value "U" indicating "undefined" is stored in each element of the array data 1021 and 1022.

The "digit (B)" call portion 110 and the object program 103 of the called procedure "digit" are then executed. The object program 103 of the procedure "digit" is started and executed by using the array data pointer 1020B as an argument. As a result, the data 1002 is generated. Since the processing is done in the same manner as the "digit (X)" call processing 1003-1006, detail thereof is omitted. The following data are obtained. The elements allocated to the main storage 421 from the pointer areas 1020A and 1020B in the procedure "digit" designate array data 1024 and 1025 both of which have four elements. The array data 1024 contains the number of elements, "4", at the top and all elements are "U". That is, all elements are undefined. The array data 1025 contains the number of elements, "4", at the top, and the elements are "1", "2", "3" and "0".

Then, the "root (B, A)" call portion 111 is executed. The object program 102 of the procedure "root" is called by using the array data pointer 1020B and 1020A as an argument. When the execution of object program 102 of the procedure root is started, the "root" initialization portion 112 is first executed and then the "digit (X)" call portion 115 is executed. When the "digit (X)" call portion 115 is started, the "digit" initialization portion 119 is first executed. After the above processing, data 1003 is generated on the main storage 421. The data 1002 remains unchanged in the data 1003, and areas 1031 and 1032 have been added. The area 1032 is a pointer area allocated by the "root" initialization portion 114, and the area 1031 is a pointer area allocated by the "digit" initialization portion 119.

The copy portion 120 is executed in the following manner. A series of data 1020, 1031, 1032 and 1024 on the main storage 421 are copied to generate four sets of data of the same structure. That is, as many copy data as the number of clauses in the original procedure "digit" 603 are made. The result is shown by 1004. Of the copy data, a first set is the original data 1070, a second set is 1071, a third set is 1072 and a fourth set is 1073. The copying is carried out in the following manner. Three areas 1036, 1040 and 1044 of the same size as that of the array data 1024 are allocated on the main storage 421, and the content of the array data 1024 is copied into those areas. Three areas of the same size as those of the array data 1020, 1032 and 1031, respectively, are allocated for each of the array data. That is, the areas 1033, 1037, 1041, 1034, 1038, 1042, 1035, 1039 and 1043 are allocated. The start addresses of 1035, 1040 and 1044 are stored in those areas as shown by 1004. The array data 1025 is copied to generate array data 1080, 1081 and 1082.

After the execution of the copy portion 120, the first clause portion 121, second clause portion 122, third clause portion 123 and fourth clause portion 124 are executed. The sequence of execution of those portions may be arbitrary, and they may be executed in parallel. In the present embodiment, they are executed orderly. After the execution of 121-124, data 1005 is generated on the main storage 421. The first clause portion 121 receives the first copy 1070 of the data 1004 and outputs the first copy 1070 of the data 1005. The second clause portion 122 receives the second copy data 1071 of the data 1004 and outputs the second copy data 1071 of the data 1005. The third clause portion 123 receives the third copy data 1072 of the data 1004 and outputs the third copy data 1072 of the data 1005. The fourth clause portion 124 receives the fourth copy data 1073 of the data 1004 and outputs the fourth copy data 1073 of the data 1005. The array data 1025, 1080, 1031 and 1081 do not change through the execution of 121-124.

The first clause portion 121 is executed in the following manner. "1" is stored in each element of the array data designated by the area 1031 corresponding to the argument of the procedure "digit" 603. The same is true for the second clause portion 122, third clause portion 123 and fourth clause portion 124. Thus, "2", "3" and "0" are stored in respective elements of the array data 1036, 1040 and 1044 designated by 1033, 1037 and 1041, respectively. The above processing may be done by using a general purpose (scalar) instruction, but high speed processing is attained when a vector instruction is used.

The merge portion 125 merges the array data 1024, 1036, 1040 and 1044, and merges the array data 1025, 1080, 1081 and 1082. The array data 1024 is merged in the following manner. The numbers of elements of the array data 1024, 1036, 1040 and 1044 are added together and an array data area 1046 having the number of elements equal to the above sum, 16, is allocated on the main storage 421. The number of elements of the array data 1024, 1036, 1040 and 1044 are stored in the top areas of the respective array data. The first to fourth elements of the array data 1046 are equal to the elements of the array data 1024, the fifth to eighth elements are equal to the elements of the array data 1036, the ninth to twelveth elements are equal to the elements of the array data 1040, and the thirteenth to sixteenth elements are equal to the elements of the array data 1044. The merging may be done by using a general purpose (scalar) instruction but high speed merging is attained when a vector instruction is used.

Merging of the array data 1025, 1080, 1081 and 1082 is carried out in the same manner. The array data 1025 in 1003 and the three copy data 1080, 1081 and 1082 are merged to generate array data 1047 having 16 elements. The array data 1046 and 1047 occupy 1006 only partially, and they fully occupy 1007.

After the execution of the merge portion 125, the process returns to the object program 102 of the procedure "root" through "digit" and processing 126, and the "root" built-in procedure processing 116 is executed. The "root" built-in procedure processing 116 is executed by using the vector instruction. Numerals 1007-1009 denote data in the course of vector operation in the "root" built-in procedure processing 116. Numerals 1050, 1051 and 1053 denote vector registers. Numeral 1054 denotes a vector mask register. Numerals 1055 and 1056 denote areas on the main storage 421.

In the "root" built-in procedure processing 116, the content of the array data 1046 is loaded to the vector register 1050. The number of elements stored at the top of the array data 1050 is not loaded. All values of the array data 1046 are stored in the vector register 1050. Similarly, the content of the array data 1047 is loaded to the vector register 1051.

Then, each elements of the vector register 1050 is squared to create an array data, which is stored into the vector register 1053. For example, the fourth element of the vector register 1050 is 2, and hence the fourth element of the vector register 1053 is $2^2 = 4$. The elements of the vector registers 1051 and 1053 are compared and the result is stored in the vector mask register 1054. The comparison is made by using the vector equality compare instruction explained with reference to FIG. 7.

The first and sixteenth elements of the vector registers 1051 and 1053 are equal and other elements are not equal. Accordingly, the first and sixteenth elements of the vector mask register 1054 are "1" and the other elements are "0".

The contents of the vector registers 1050 and 1051 are compressed in accordance with the content of the vector mask register 1054 and the results are stored into the newly allocated areas 1055 and 1056 on the main storage 421, respectively. The elements "1" and "0" of the vector register 1050 which correspond to the first and sixteenth elements "1" of the vector mask register 1054 are stored into 1055. Similarly, the first element "1" and the sixteenth element "0" of the vector register 1051 are stored into the area 1056 on the main storage 421. The compression may be done by using the vector compress instruction.

Numeral 1010 denotes data on the main storage 421 after the last step of the "root" built-in procedure processing 116. In the processing, the number of elements, "2", is stored at the top of the main storage areas 1055 and 1056 and the start addresses are stored into 1020A, 1020B, 1031X and 1031Y.

After the above processing, the process returns to the object program of the question through the "root" end processing 117, and the elements of the array data designated by 1020B in the question built-in procedure processing 112, that is, "1" and "0", are printed out. Then, the execution is terminated.

(d) Compiling method

Figure 11:
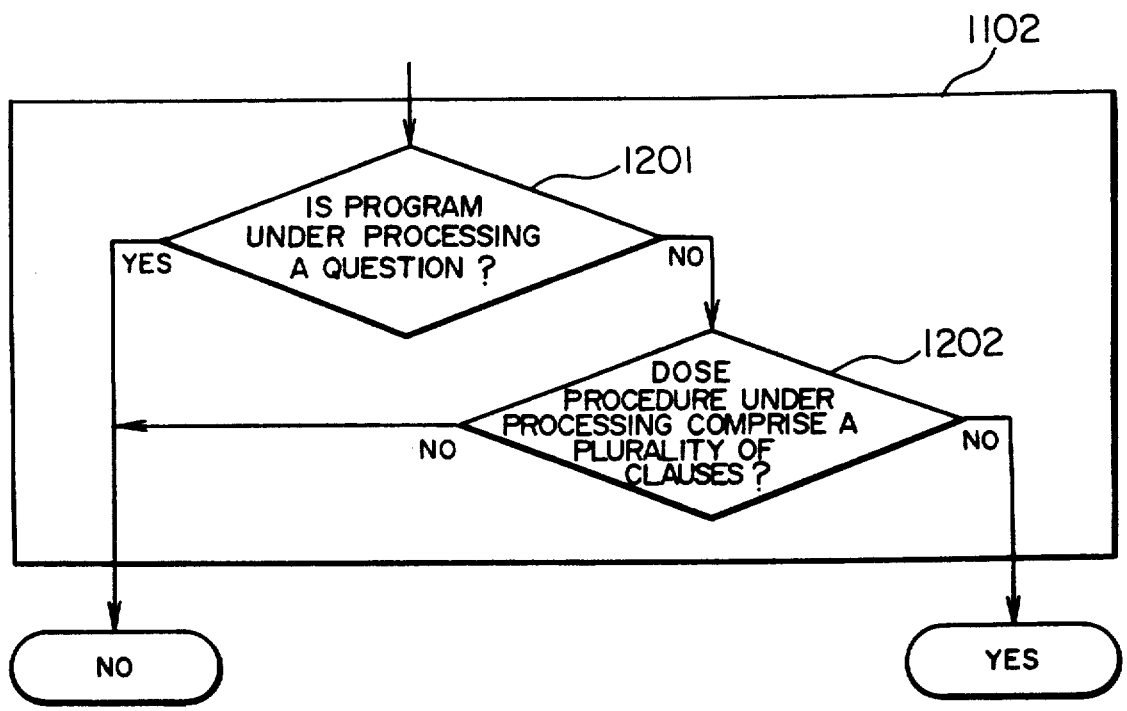
FIG. 11 shows a flow chart of step 1102 of FIG. 10.

A compiling method for compiling the logic programming language program of FIG. 6 to the object program of FIG. 1 is explained with reference to FIG. 11.

All the procedures are compiled repeatedly as shown by 1100. A question is considered as one procedure. In the program of FIG. 6, processing 1101-1106 are carried out for the question 601, procedure 602 and procedure "digit" 603, respectively.

An initialization portion is first generated. A question initialization portion 109 is generated for the question 601, a "root" initialization portion 114 is generated for the procedure "root" 602, and a "digit" initialization portion 119 is generated for the procedure "digit" 603.

Solution check processing 1102 for checking whether there is a possibility that the procedure before compiling produces argument data through retrial (that is, the retrial successes) is carried out. The content of the processing is further explained with reference to FIG. 11. If the processing 1102 determines that the argument data is not produced by the retrial, only processing 1103 is carried out. Otherwise, processing 1104, 1103 and 1106 are carried out in this order.

The processing 1104, 1103 and 1106 are executed for the procedure "digit" 603. In the processing 1104, the copy portion 120 is generated. In the processing 1105, the first to fourth clause portions 121-124 of the procedure "digit" 603 are generated. In the processing 1106, the merge portion 125 is generated. On the other hand, the processing 1103 is executed for the question and the procedure "root" 602. A question first clause portion 140 is generated for the question 601. A "root" first clause portion 141 is generated for the procedure 602. The question first clause portion 140 comprises program portions 110-112, and the "root" first clause portion 141 comprises program portions 115-116. The generation of those program portions is explained with reference to FIG. 12.

Thus, all portions of the program 100 of FIG. 1 have been generated, and the compiling is terminated.

The solution check processing 1102 is explained with reference to FIG. 11. Whether the program under execution is question or not is checked (processing 1201), and if it is a question, the decision of the solution check processing 1102 is rendered NO. If it is not a question, whether the procedure under execution comprises a plurality of clauses or not, and if so, the result of the solution check processing 1102 is rendered YES. If it is not, the result is rendered NO. Since the procedure "root" comprises only one clause, the result of the solution check processing 1102 for the procedure "root" 602 is NO. Since the procedure "digit" 603 comprises a plurality of clauses, the result is YES.

In this check method, the result may be YES even if an argument data will not be produced by the retrial (the retrial does not success). In this case, unnecessary copy portion and merge portion are generated and unnecessary copying and merging are carried out in the execution, although the execution result is not changed from the case of not YES.

Figure 12:
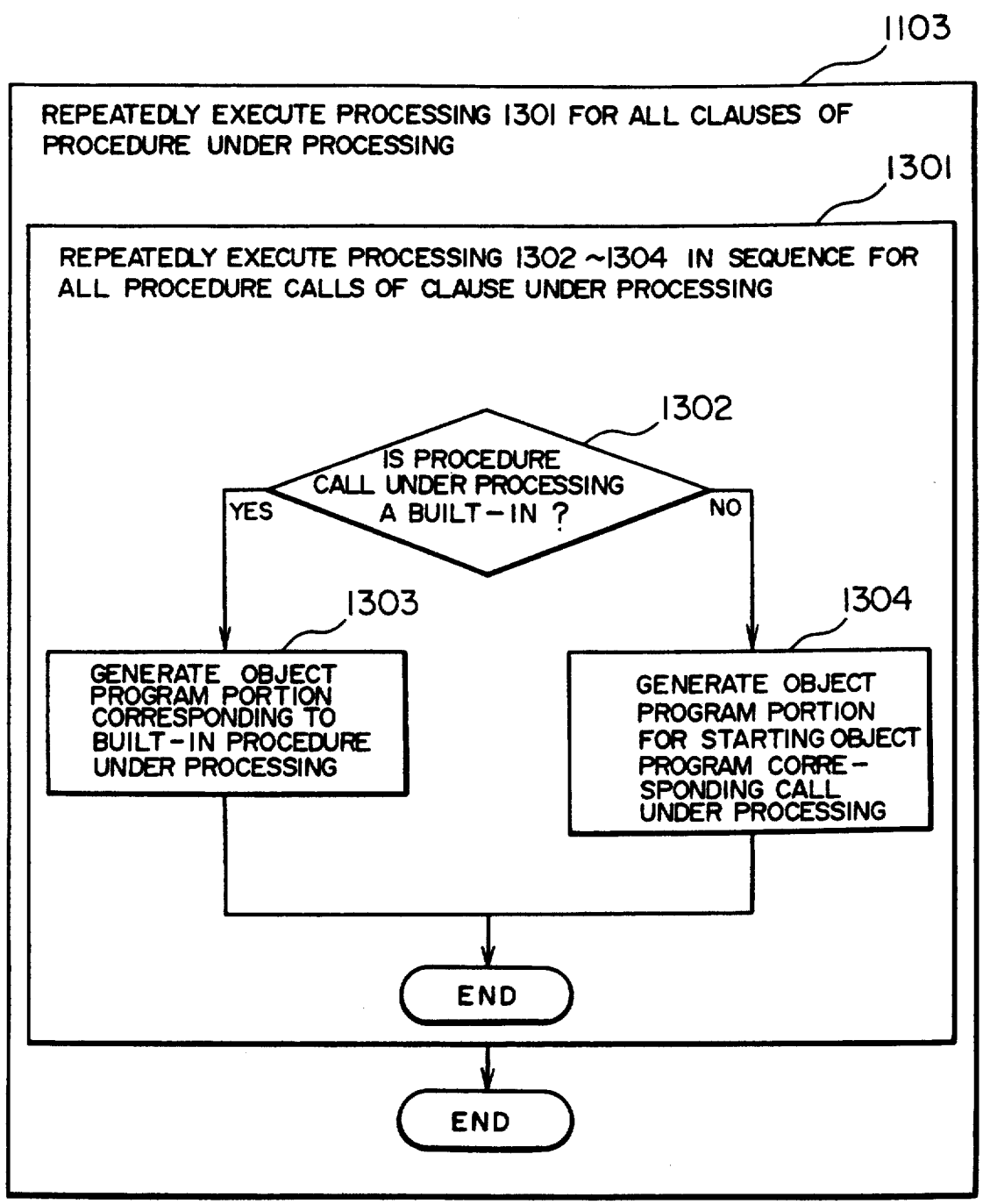
FIG. 12 shows a flow chart of step 1103 of FIG. 10.

The first to n-th clause portion generation processing 1103 is explained with reference to FIG. 12. In the processing 1103, the following processing 1301 is executed for each of the clauses of the procedure under processing, in the order of the clauses. In the program 600 of FIG. 6, the processing 1301 is executed for the question 601, the single clause of the procedure "root" 602 and each clause of the procedure "digit" 603.

In the processing 1301, the following processing 1302-1304 are sequentially executed for all procedure calls of the clauses under processing. In the program 600, the processing 1302-1304 are executed for each of "digit (B)", "root (B, A)", "write (B)" and "fail" for the question 601. For the single clause of the procedure "root" 602, the processing 1302-1304 are executed for each of "digit (X)" and "Y is X * X". Since the procedure "digit" 603 contains no procedure call, the processing 1302-1304 are not executed.

The processing 1302 checks if the procedure call under processing is the call of the built-in procedure or not. In the program 600, "write (B)", "fail" and "Y is X * X" are determined to be the calls of the built-in procedure, and "digit (B)", "root (B, A)" and "digit (X)" are determined not to be the built-in procedure.

If the built-in procedure is detected in the processing 1302, the processing 1303 is executed. The object program portion corresponding to the built-in procedure under processing is generated. In the program 600, question built-in procedure processing 112 is generated for "write (B)". Nothing is generated for "fail". (An empty object program is generated.) Root built-in procedure processing 116 is generated for "Y is X * X".

If the processing 1302 determines that it is not a built-in procedure, the processing 1304 is executed. An object program portion for starting the object program corresponding to the procedure call under processing is generated. In the program 600, a "digit (B)" call portion 110 is generated for "digit (B)", a "root (B, A)" call portion 111 is generated for "root (B, A)", and a "digit (X)" call portion 115 is generated for "digit (X)".

In accordance with the present invention, the logic programming language procedure having a plurality of solutions is partially executed by using the vector instruction and the execution speed is improved.

We claim:

1. A method for controlling a vector processor so as to detect whether or not a value of each data signal among a first set of data signals has a specific relation with a value of one of a second set of data signals, the vector processor including an operation unit for performing an arithmetical or logical operation in a pipelined manner on vector data, the method comprising the steps of:

(a) forming, from the first set of data signals, first vector comprised of groups of data signals, wherein said groups respectively correspond to different data signals of said first set of data signals, and data signals of each group are all equal to one data signal to which said each group corresponds among said data signals belonging to said first set of data signals and a total number of data signals of said each group is equal to a total number of data signals belonging to said second set of data signals;

(b) forming, from said second set of data signals, second vector data comprised of groups of data signals, wherein data signals in each group are respectively equal to the data signals belonging to the second set of data signals and the number of the groups is equal to the number of data signals belonging to the first set of data signals; and (c) controlling the operation of said operation unit so that said operation unit determines whether or not a value of each data signal of the first vector data has a specific relation with a value of a corresponding data signal of the second vector data which is equal in vector element number to said each data signal of the first vector data thereby causing said operation unit to prvide third vector data including result data signals each indicative of a result of the determination for a pair of data signals including a data signal of the first vector data and a corresponding data signal of the second vector data; and (d) detecting, in response to the result data signals included in the third vector vector which one of the first set of data signals has a specific relation to one of the second set of data signals.

2. A method for controlling a vector processor according to claim 1, wherein the step (d) comprises the steps of:

(d1) forming fourth vector data which includes as elements thereof a part of the data signals belonging to the first vector data, depending upon whether corresponding result data signals of the third vector data have a predetermined value; and (d2) forming fifth vector data which includes as elements thereof a part of the data signals belonging to the second vector data, depending upon whether corresponding result data signals of the third vector data have the predetermined value.

3. A method for controlling a vector processor according to claim 1, further comprising the steps of:

forming the first and second vector data on a main storage of said vector processor and then transferring them to first and second ones of a plurality of vector registers provided in said vector processor wherein the operation by said operation unit is done on the first and second vector data held by the first and second vector registers;

transferring the third vector data provided by said operation unit to a vector mask register provided in said vector processor; and gathering the fourth and fifth vector data on said main storage based upon the third vector data held by the vector mask register.

4. A method for controlling a vector processor so as to detect whether a value of each data signal among a first set of data signals has a specific relation with a value of one of a second set of data signals by performing an arithmetic or logical operation on a respective one of data signals belonging to a first set of data signals and a respective one of data signals belonging to a second set of data signals, the vector processor including an operation unit for performing said arithmetic or logical operation in a pipelined manner on vector data, the method comprising the steps of:

(a) forming, from said first set of data signals, first vector data comprised of groups of data signals, wherein said groups respectively correspond to different data signals of said first set of data signals and data signals of a respective one of the groups are all equal to one data signal to which the one group corresponds among said data signals belonging to said first set and a total number of data signals of a respective group is equal to a total number of data signals of the second set of data signals;

(b) forming, from said second set of data signals, second vector data comprised of groups of data signals, wherein data signals in each of the groups of the second vector data are respectively equal to said data signals belonging to said second set of data signals and a total number of the groups is equal to a total number of data signals belonging to the first set of data signals; and (c) controlling the operation of said operation unit so that said operation unit performs an arithmetical or logical operation on paris of data signals each including a data signal of the first vector data and a corresponding data signal of the second vector data, thereby causing said operation unit to provide third vector data comprising result data signals for detecting whether a pair of data data signals which have received the operation has a specific relation with each other.

* * * * *